US008321871B1

(12) United States Patent
Jackson

(10) Patent No.: US 8,321,871 B1
(45) Date of Patent: Nov. 27, 2012

(54) SYSTEM AND METHOD OF USING TRANSACTION IDS FOR MANAGING RESERVATIONS OF COMPUTE RESOURCES WITHIN A COMPUTE ENVIRONMENT

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 1497 days.

(21) Appl. No.: 11/155,090

(22) Filed: Jun. 17, 2005

Related U.S. Application Data

(60) Provisional application No. 60/581,257, filed on Jun. 18, 2004.

(51) Int. Cl.
*G06F 9/46* (2006.01)
*G06F 15/173* (2006.01)

(52) U.S. Cl. ......... 718/104; 718/100; 718/101; 709/226

(58) Field of Classification Search .................. 718/100, 718/102, 104; 709/226; 705/8
See application file for complete search history.

(56) References Cited

U.S. PATENT DOCUMENTS

| | | | |
|---|---|---|---|
| 5,175,800 A | 12/1992 | Gailis et al. | |
| 5,307,496 A | 4/1994 | Ichinose et al. | |
| 5,355,508 A | 10/1994 | Kan | |
| 5,473,773 A | 12/1995 | Aman et al. | |
| 5,504,894 A | 4/1996 | Ferguson et al. | |
| 5,550,970 A | 8/1996 | Cline et al. | |
| 5,826,082 A * | 10/1998 | Bishop et al. | 718/104 |
| 5,832,517 A * | 11/1998 | Knutsen, II | 1/1 |
| 5,881,238 A | 3/1999 | Aman et al. | |
| 5,918,017 A | 6/1999 | Attanasio et al. | |
| 5,920,863 A * | 7/1999 | McKeehan et al. | 718/101 |

(Continued)

FOREIGN PATENT DOCUMENTS

GB 2392265 2/2004

(Continued)

OTHER PUBLICATIONS

Chuang Liu et al. "Design and Evaluation of a Resource Selection Framework for Grid Applications" High Performance Distributed Computing, 2002. HPDC-11 2002. Proceedings S. 11$^{th}$ IEEE International Symposium on Jul. 23-26, 2002, Piscataway, NJ, USA IEEE, Jul. 23, 2002, pp. 63-72, XP010601162 ISBN: 978-0-7695-1686-8.

(Continued)

*Primary Examiner* — Meng An
*Assistant Examiner* — Tammy Lee
(74) *Attorney, Agent, or Firm* — Thomas M. Isaacson

(57) ABSTRACT

A system and method for reserving resources within a compute environment such as a cluster or grid are disclosed. The method aspect of the disclosure includes receiving a request for resource availability in a compute environment from a requestor, associating a transaction identification with the request and resources within the compute environment that can meet the request and presenting the transaction identification to the requestor. The transaction ID can also be associated with a time frame in which resources are available and can also be associated with modifications to the resources and supersets of resources that could be drawn upon to meet the request. The transaction ID can also be associated with metrics that identify how well the resource fit with the request and modifications that can make the resources better match the workload which would be submitted under the request.

31 Claims, 2 Drawing Sheets

U.S. PATENT DOCUMENTS

| | | | |
|---|---|---|---|
| 5,933,417 A | 8/1999 | Rottoo | |
| 5,958,003 A * | 9/1999 | Preining et al. | 718/100 |
| 6,003,061 A | 12/1999 | Jones et al. | |
| 6,021,425 A | 2/2000 | Waldron, III et al. | |
| 6,067,545 A | 5/2000 | Wolff | |
| 6,076,174 A | 6/2000 | Freund | |
| 6,088,718 A * | 7/2000 | Altschuler et al. | 709/203 |
| 6,098,090 A | 8/2000 | Burns | |
| 6,101,508 A | 8/2000 | Wolff | |
| 6,167,445 A | 12/2000 | Gai et al. | |
| 6,212,542 B1 | 4/2001 | Kahle et al. | |
| 6,278,712 B1 | 8/2001 | Takihiro et al. | |
| 6,298,352 B1 | 10/2001 | Kannan et al. | |
| 6,314,555 B1 | 11/2001 | Ndumu et al. | |
| 6,324,279 B1 | 11/2001 | Kalmanek, Jr. et al. | |
| 6,330,008 B1 | 12/2001 | Razdow et al. | |
| 6,330,583 B1 | 12/2001 | Reiffin | |
| 6,333,936 B1 | 12/2001 | Johansson et al. | |
| 6,334,114 B1 * | 12/2001 | Jacobs et al. | 705/26.8 |
| 6,366,945 B1 | 4/2002 | Fong et al. | |
| 6,370,154 B1 | 4/2002 | Wickham | |
| 6,374,297 B1 | 4/2002 | Wolf et al. | |
| 6,418,459 B1 * | 7/2002 | Gulick | 718/104 |
| 6,463,454 B1 | 10/2002 | Lumelsky et al. | |
| 6,496,566 B1 | 12/2002 | Posthuma | |
| 6,496,866 B2 | 12/2002 | Attanasio et al. | |
| 6,519,571 B1 | 2/2003 | Guheen et al. | |
| 6,526,442 B1 | 2/2003 | Stupek, Jr. et al. | |
| 6,564,261 B1 | 5/2003 | Gudjonsson et al. | |
| 6,571,215 B1 * | 5/2003 | Mahapatro | 705/8 |
| 6,584,489 B1 | 6/2003 | Jones et al. | |
| 6,587,938 B1 | 7/2003 | Eilert et al. | |
| 6,590,587 B1 | 7/2003 | Wichelman et al. | |
| 6,662,202 B1 * | 12/2003 | Krusche et al. | 718/101 |
| 6,662,219 B1 | 12/2003 | Nishanov et al. | |
| 6,687,257 B1 | 2/2004 | Balasubramanian | |
| 6,690,400 B1 | 2/2004 | Moayyad et al. | |
| 6,760,306 B1 | 7/2004 | Pan et al. | |
| 6,771,661 B1 | 8/2004 | Chawla et al. | |
| 6,829,762 B2 | 12/2004 | Arimilli et al. | |
| 6,912,533 B1 | 6/2005 | Hornick | |
| 6,925,431 B1 | 8/2005 | Papaefstathiou | |
| 6,938,256 B2 | 8/2005 | Deng et al. | |
| 6,948,171 B2 | 9/2005 | Dan et al. | |
| 6,966,033 B1 | 11/2005 | Gasser et al. | |
| 6,975,609 B1 | 12/2005 | Khaleghi et al. | |
| 6,985,937 B1 | 1/2006 | Keshav et al. | |
| 7,003,414 B1 | 2/2006 | Wichelman et al. | |
| 7,035,230 B1 | 4/2006 | Shaffer et al. | |
| 7,072,807 B2 | 7/2006 | Brown et al. | |
| 7,124,410 B2 * | 10/2006 | Berg et al. | 718/104 |
| 7,143,168 B1 | 11/2006 | DiBiasio et al. | |
| 7,145,995 B2 | 12/2006 | Oltmanns et al. | |
| 7,168,049 B2 | 1/2007 | Day | |
| 7,177,823 B2 * | 2/2007 | Lam et al. | 705/10 |
| 7,185,073 B1 | 2/2007 | Gai et al. | |
| 7,188,174 B2 * | 3/2007 | Rolia et al. | 709/226 |
| 7,191,244 B2 | 3/2007 | Jennings et al. | |
| 7,197,561 B1 | 3/2007 | Lovy et al. | |
| 7,222,343 B2 * | 5/2007 | Heyrman et al. | 718/100 |
| 7,236,915 B2 | 6/2007 | Algieri et al. | |
| 7,289,619 B2 | 10/2007 | Vivadelli et al. | |
| 7,296,268 B2 | 11/2007 | Darling et al. | |
| 7,308,687 B2 * | 12/2007 | Trossman et al. | 718/104 |
| 7,328,406 B2 * | 2/2008 | Kalinoski et al. | 715/738 |
| 7,353,495 B2 * | 4/2008 | Somogyi | 717/120 |
| 7,376,693 B2 | 5/2008 | Neiman et al. | |
| 7,386,586 B1 * | 6/2008 | Headley et al. | 709/202 |
| 7,386,850 B2 * | 6/2008 | Mullen | 718/104 |
| 7,403,994 B1 | 7/2008 | Vogl et al. | |
| 7,423,971 B1 | 9/2008 | Mohaban et al. | |
| 7,502,747 B1 * | 3/2009 | Pardo et al. | 705/8 |
| 7,502,884 B1 | 3/2009 | Shah et al. | |
| 7,516,455 B2 * | 4/2009 | Matheson et al. | 718/102 |
| 7,546,553 B2 * | 6/2009 | Bozak et al. | 715/853 |
| 7,568,199 B2 * | 7/2009 | Bozak et al. | 718/104 |
| 7,640,547 B2 * | 12/2009 | Neiman et al. | 718/104 |
| 7,716,193 B2 * | 5/2010 | Krishnamoorthy | 707/703 |
| 8,166,484 B2 * | 4/2012 | Kawato | 718/104 |
| 2002/0007389 A1 | 1/2002 | Jones et al. | |
| 2002/0031364 A1 | 3/2002 | Suzuki et al. | |
| 2002/0087699 A1 | 7/2002 | Karagiannis et al. | |
| 2002/0099842 A1 | 7/2002 | Jennings et al. | |
| 2002/0116234 A1 | 8/2002 | Nagasawa | |
| 2002/0120741 A1 | 8/2002 | Webb et al. | |
| 2002/0156904 A1 | 10/2002 | Gullotta et al. | |
| 2002/0166117 A1 | 11/2002 | Abrams et al. | |
| 2003/0005130 A1 | 1/2003 | Cheng | |
| 2003/0018766 A1 | 1/2003 | Duvvuru | |
| 2003/0018803 A1 | 1/2003 | El Batt et al. | |
| 2003/0028645 A1 | 2/2003 | Romagnoli | |
| 2003/0061260 A1 | 3/2003 | Rajkumar | |
| 2003/0061262 A1 | 3/2003 | Hahn et al. | |
| 2003/0088457 A1 | 5/2003 | Keil et al. | |
| 2003/0126200 A1 | 7/2003 | Wolff | |
| 2003/0131043 A1 * | 7/2003 | Berg et al. | 709/104 |
| 2003/0135615 A1 | 7/2003 | Wyatt | |
| 2003/0135621 A1 | 7/2003 | Romagnoli | |
| 2003/0154112 A1 | 8/2003 | Neiman et al. | |
| 2003/0158884 A1 | 8/2003 | Alford | |
| 2003/0169269 A1 | 9/2003 | Sasaki et al. | |
| 2003/0182425 A1 * | 9/2003 | Kurakake | 709/226 |
| 2003/0185229 A1 | 10/2003 | Shachar et al. | |
| 2003/0200109 A1 | 10/2003 | Honda et al. | |
| 2003/0212792 A1 | 11/2003 | Raymond | |
| 2003/0216951 A1 | 11/2003 | Ginis et al. | |
| 2003/0217129 A1 | 11/2003 | Knittel et al. | |
| 2003/0233378 A1 | 12/2003 | Butler et al. | |
| 2003/0233446 A1 | 12/2003 | Earl | |
| 2004/0030741 A1 | 2/2004 | Wolton et al. | |
| 2004/0044718 A1 | 3/2004 | Ferstl et al. | |
| 2004/0064817 A1 | 4/2004 | Shibayama et al. | |
| 2004/0103339 A1 | 5/2004 | Chalasani et al. | |
| 2004/0103413 A1 | 5/2004 | Mandava et al. | |
| 2004/0107281 A1 | 6/2004 | Bose et al. | |
| 2004/0117768 A1 | 6/2004 | Chang et al. | |
| 2004/0133889 A1 * | 7/2004 | Colle et al. | 718/100 |
| 2004/0139202 A1 | 7/2004 | Talwar et al. | |
| 2004/0139464 A1 | 7/2004 | Ellis et al. | |
| 2004/0196308 A1 | 10/2004 | Blomquist | |
| 2004/0205101 A1 | 10/2004 | Radhakrishnan | |
| 2004/0215780 A1 | 10/2004 | Kawato | |
| 2004/0216121 A1 | 10/2004 | Jones et al. | |
| 2004/0236852 A1 | 11/2004 | Birkestrand et al. | |
| 2004/0244006 A1 * | 12/2004 | Kaufman et al. | 718/105 |
| 2004/0260746 A1 * | 12/2004 | Brown et al. | 709/200 |
| 2005/0027864 A1 * | 2/2005 | Bozak et al. | 709/226 |
| 2005/0050270 A1 | 3/2005 | Horn et al. | |
| 2005/0071843 A1 | 3/2005 | Guo et al. | |
| 2005/0155033 A1 * | 7/2005 | Luoffo et al. | 718/104 |
| 2005/0228892 A1 | 10/2005 | Riley et al. | |
| 2005/0246666 A1 * | 11/2005 | Kalinoski et al. | 715/963 |
| 2005/0256942 A1 | 11/2005 | McCardle et al. | |
| 2005/0278760 A1 | 12/2005 | Dewar et al. | |
| 2005/0283534 A1 | 12/2005 | Bigagli et al. | |
| 2005/0283782 A1 * | 12/2005 | Lu et al. | 718/100 |
| 2006/0013132 A1 | 1/2006 | Garnett et al. | |
| 2006/0069594 A1 * | 3/2006 | Yamasaki | 705/7 |
| 2006/0097863 A1 | 5/2006 | Horowitz et al. | |
| 2006/0106931 A1 * | 5/2006 | Richoux | 709/226 |
| 2006/0200773 A1 | 9/2006 | Nocera et al. | |
| 2006/0236368 A1 | 10/2006 | Raja et al. | |
| 2006/0271552 A1 | 11/2006 | McChesney et al. | |
| 2006/0294238 A1 | 12/2006 | Naik et al. | |
| 2007/0204036 A1 | 8/2007 | Mohaban et al. | |
| 2008/0168451 A1 | 7/2008 | Challenger et al. | |
| 2008/0184248 A1 * | 7/2008 | Barua et al. | 718/104 |
| 2008/0216082 A1 | 9/2008 | Eilam et al. | |
| 2008/0288873 A1 | 11/2008 | McCardle et al. | |
| 2009/0216881 A1 | 8/2009 | Lovy et al. | |

FOREIGN PATENT DOCUMENTS

| | | |
|---|---|---|
| WO | WO 03/060798 | 9/2003 |
| WO | WO 2004/021109 | 3/2004 |
| WO | WO 2004/046919 | 6/2004 |

OTHER PUBLICATIONS

Lars C. Wolf et al. "Concepts for Resource Reservation in Advance" Multimedia Tools and Applications, [Online] 1997, pp. 255-278, XP009102070 The Netherlands Retreived from the Internet: URL: http://www.springerlink.com/content/h25481221mu22451/fulltext.pdf [retrieved on Jun. 23, 2008].

Luo et al. "A Language Modeling Framework for Resource Selection and Results Merging". Conference on Information and Knowledge Management. 2002 ACM pp. 391-397.

Leinberger, W. et al., "Gang Scheduling for Distributed Memory Systems", University of Minnesota—Computer Science and Engineering—Technical Report, Feb. 16, 2000, vol. TR 00-014.

Brad Stone et al., UNIX Fault Management: A Guide for System Administration, Dec. 1, 1999, ISBN 0-13-026525-X, http://www.informit.com/content/images/013026525X/samplechapter/013026525.pdf.

IBM Tivoll Workload Scheduler job Scheduling Console User's Guide Feature Level 1.2 (Maintenance Release Oct. 2003), IBM Corporation, http://publib.boulder.ibm.com/tividd/td/TWS/SH19-4552-01/en_US/PDF/jsc_user.pdf.

Chen et al., "A flexible service model for advance reservation", Computer Networks, Elsevier science publishers, vol. 37, No. 3-4, pp. 251-262, Nov. 5, 2001.

Roy, Alain, "Advance Reservation API", University of Wisconsin-Madison, GFD-E.5, Scheduling Working Group, May 23, 2002.

Supercluster Research and Development Group, "Maui Administrator's Guide", Internet citation, 2002.

Snell, et al., "The Performance Impact of Advance Reservation Meta-scheduling", pp. 137-153, Springer-Verlag Berlin Heidelberg, 2000.

Si et al., "Language Modeling Framework for Resource Selection and Results Merging", SIKM 2002. Proceedings of the eleventh international conference on Information and Knowledge Management.

Chase et al., "Dynamic Virtual Clusters in a Grid Site Manager", Proceedings of the 12$^{th}$ IEEE International Symposium on High Performance Distributed Computing (HPDC'03), 2003.

* cited by examiner

SYSTEM AND METHOD OF USING TRANSACTION IDS FOR MANAGING RESERVATIONS OF COMPUTE RESOURCES WITHIN A COMPUTE ENVIRONMENT

PRIORITY CLAIM

The present application claims priority to U.S. Provisional Application No. 60/581,257 filed Jun. 18, 2004, the contents of which are incorporated herein by reference.

BACKGROUND OF THE INVENTION

1. Technical Field of the Invention

The present disclosure relates to reservations in a compute environment and more specifically to a system and method of using transaction IDs to manage reservations of resources within the compute environment.

2. Introduction

The present disclosure relates to a system and method of managing compute resources in the context of a grid or cluster of computers. Grid computing can be defined as coordinated resource sharing and problem solving in dynamic, multi-institutional collaborations. Many computing projects require much more computational power and resources than a single computer or single processor can provide. Networked computers with peripheral resources such as printers, scanners, I/O devices, storage disks, scientific devices and instruments, etc. can need to be coordinated and utilized to complete a task.

Grid/cluster resource management generally describes the process of identifying requirements, matching resources to applications, allocating those resources, and scheduling and monitoring grid resources over time in order to run cluster/grid applications or jobs as efficiently as possible. Each project will utilize a different set of resources and thus is typically unique. In addition to the challenge of allocating resources for a particular job, administrators also have difficulty obtaining a clear understanding of the resources available, the current status of the cluster/grid and available resources, and real-time competing needs of various users. One aspect of this process is the ability to reserve resources for a job. A cluster manager will seek to reserve a set of resources to enable the cluster to process a job at a promised quality of service.

General background information on clusters and grids can be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. The term compute environment can apply to a cluster, a grid or variations on the general concepts of clusters or grids. The definition of a cluster or grid is very flexible and can refer to a number of different configurations of computers. The introduction here is meant to be general given the variety of configurations that are possible. In general, a grid will include a group of clusters as will be shown in FIG. 1A. Several challenges exist when attempting to maximize resources in a compute environment. First, there are typically multiple layers of grid and cluster schedulers. A grid 100 can include a group of clusters or a group of networked computers within a particular administrative control. A grid scheduler 102 communicates with a group of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which can refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies can also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment the configuration of the cluster environment and also losses in efficiency with the fragmentation associated with meeting particular policies.

To manage the jobs submissions, a cluster scheduler will employ reservations to insure that jobs will have the resources necessary for processing. FIG. 1B illustrates a cluster/node diagram for a cluster with nodes 120. Time is along the X axis. An access control list (ACL) 114 to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. The deficiency with this approach is that there are situations in which organizations would like to make resources available but only in such a way as to balance or meet certain performance goals. Given the prior art model, companies are unable to have the flexibility over their cluster resources. Furthermore, it is difficult for a requestor of resources to manage requests especially given the possibility that requests can be denied because of a lack of resources or a mis-match in the requirements for the job versus service level agreements.

To improve the management of cluster resources, what is needed in the art is a method associated with administrative software to manage reservations of resources in the compute environment more efficiently and with more flexibility.

SUMMARY OF THE INVENTION

Additional features and advantages of the disclosure will be set forth in the description which follows, and in part will be obvious from the description, or can be learned by practice of the disclosure. The features and advantages of the disclosure can be realized and obtained by means of the instruments and combinations particularly pointed out in the appended claims. These and other features of the present disclosure will become more fully apparent from the following description and appended claims, or can be learned by the practice of the disclosure as set forth herein.

The present disclosure relates to systems, methods and computer-readable media for managing a reservation of cluster resources using a transaction identification (ID). The transaction ID simplifies the process of identifying what resources are available to be reserved for a submitter. A transaction ID is used to identify resources within a cluster environment that can meet a submitters request for cluster resources. Further, the transaction ID can also be used in association with modifications the cluster resources to more adequately match the submitter's request.

One embodiment of the disclosure relates to a method of reserving resources within a cluster environment. The method includes receiving a request for resources in the cluster environment from a submitter. In response to the request, the method includes presenting information associated with cluster resources that can meet the request and associating a transaction identification with the request and the presented information.

Once the transaction ID is associated with the presented information about available cluster resources, the transaction ID is used as a reference for that request from the submitter. The submitter can then commit the resources after reviewing the presented information. In another aspect of the disclosure, the submitter can view the presented information which can include detailed information about the nodes that would be reserved in the cluster if the submitter were to commit the transaction. The submitter can then also be presented with the option of modifying the cluster environment according to the needs of the submitter. Such a modification can take the form of re-provisioning a group of the compute resources to enable them to more favorably and efficiently process the submitted job.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE INVENTION

Figure 1:
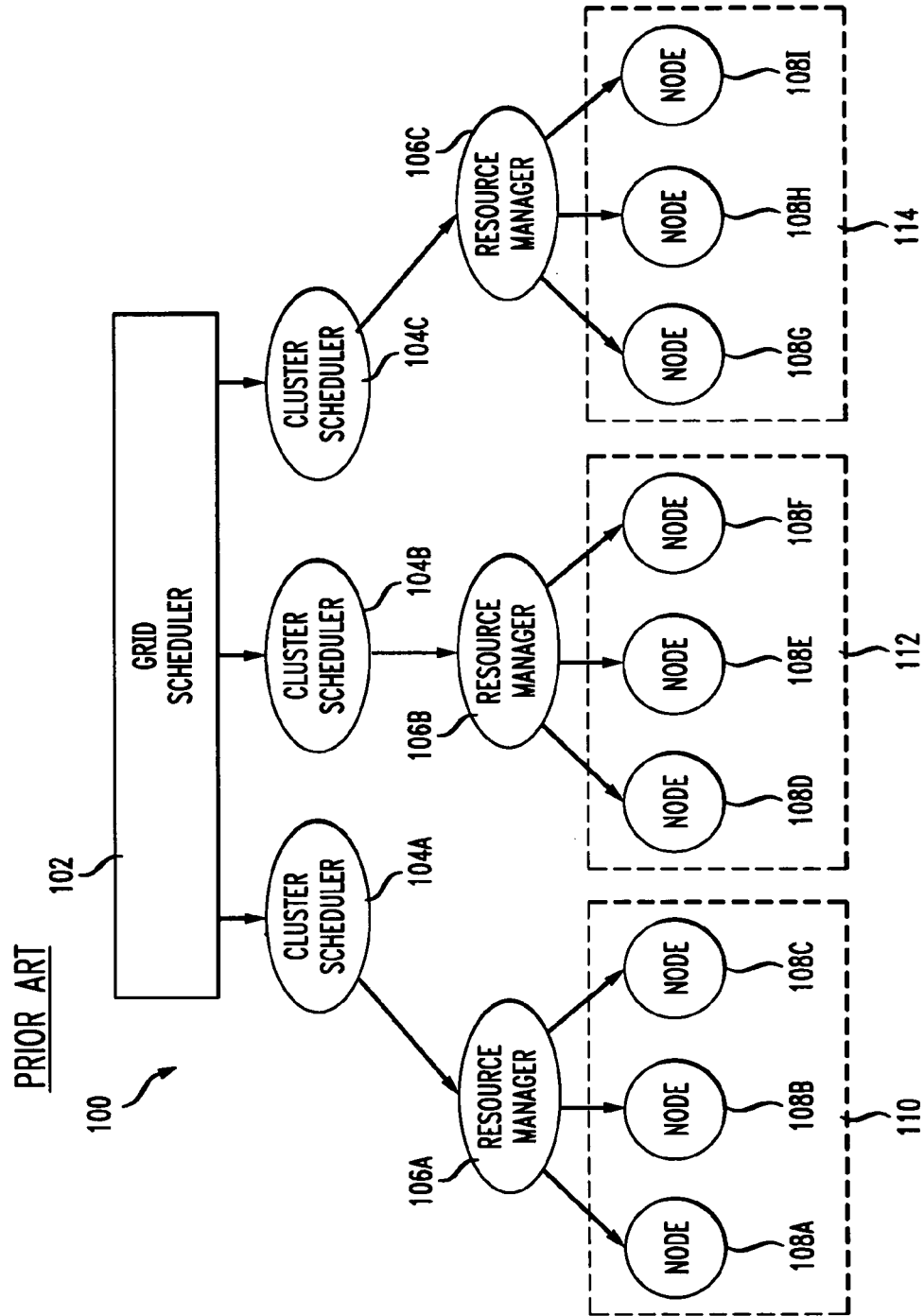
FIG. 1A illustrates generally a grid scheduler, cluster scheduler, and resource managers interacting with compute nodes.
FIG. 1B illustrates the use of an access control list for generating reservations of resources within a compute environment.
Figure 1B:
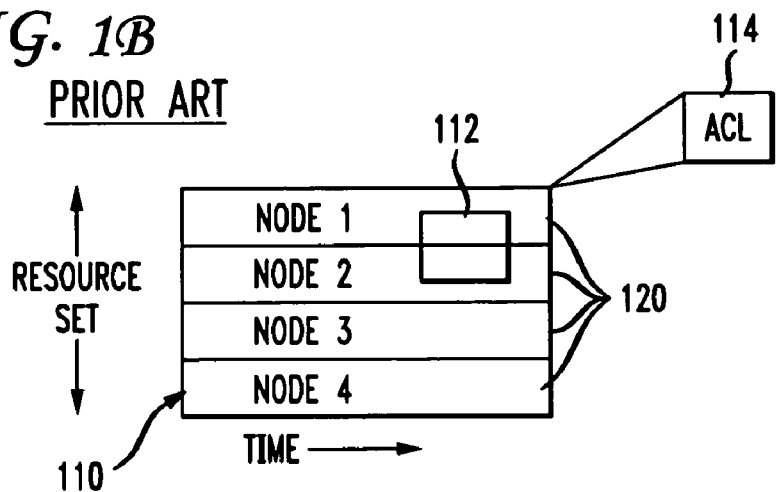

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The present disclosure relates to resource reservations in the context of a cluster or a grid environment. The cluster can be operated by a hosting facility, hosting center, a virtual hosting center, data center, grid, cluster and/or utility-based computing environments. The system aspect of the disclosure includes a computing device that operates software that practices the steps of the disclosure to manage compute resources. There are many known types of computing devices that are known to those of skill in the art and that are acceptable as the system embodiment of the disclosure. Therefore, the specific computing processor, memory, bus system, storage medium, network card, modem or other communications means are not discussed in that they are interchangeable and generally known. The computing device can be a single device or a group of connected computing devices that enable the disclosure to be practiced. The software operating within the system is comprised of computer program modules written in a computing language, such as the C programming language or any other suitable programming language. The programming modules include all the necessary programming to communicate with the compute environment (i.e., such as the cluster/grid) and both receive information about the compute resources within the compute environment and also manage the reservation and use of those compute resources.

The disclosure disclosed herein relates to the concept of the transaction identification associated with a request for compute resources either as they exist to meet the request or the potential compute environment which, if modified, can meet the request or meet with request under a different (perhaps better) criteria. Therefore, the system embodiment of the disclosure will include the various modules run on a computing device(s) that practice the steps of the method embodiment of the disclosure disclosed herein. For example, a system for managing compute resources within a compute environment can comprise means for receiving a request for resource availability in a compute environment from a requestor, means for associating transaction identification with the request and resources within the compute environment; and means for presenting the transaction identification to the requestor. The means for performing these steps this can be, as mentioned above, computer programmed modules within a software package that perform these steps.

Prior to discussing further the transaction identification aspect of the disclosure, some other explanatory information is provided about reservations and the access control list. Every reservation consists of three major components, a set of resources, a timeframe, and an access control list (ACL). Additionally, a reservation can also have a number of optional attributes controlling its behavior and interaction with other aspects of scheduling. A reservation's ACL specifies which jobs can use a reservation. Only jobs which meet one or more of a reservation's access criteria are allowed to use the reserved resources during the reservation timeframe. The reservation access criteria can include at least following: users, groups, accounts, classes, QOS and job duration. Other criteria can apply as well. A job can be any venue or end of consumption of resource for any broad purpose, whether it be for a batch system, direct volume access or other service provisioning.

A workload manager, or scheduler, will govern access to the cluster environment. The workload manager receives requests for and creates reservations for jobs. A workload manager functions by manipulating five primary, elementary objects. These are jobs, nodes, reservations, QOS structures, and policies. In addition to these, multiple minor elementary objects and composite objects are also utilized. These objects are also defined in the scheduling dictionary.

Job information is provided to the workload manager scheduler from a resource manager such as Loadleveler, PBS, Wiki, or LSF. Those of skill in the art will be familiar with each of these software products. Job attributes include ownership of the job, job state, amount and type of resources required by the job, and a wallclock limit, indicating how long the resources are required. A job consists of one or more requirements each of which requests a number of resources of a given type. For example, a job can consist of two requirements, the first asking for '1 IBM SP node with at least 512 MB of RAM' and the second asking for '24 IBM SP nodes with at least 128 MB of RAM'. Each requirement consists of one or more tasks where a task is defined as the minimal independent unit of resources. By default, each task is equivalent to one processor. In SMP environments, however, users can wish to tie one or more processors together with a certain amount of memory and/or other resources.

A job requirement (or req) consists of a request for a single type of resources. Each requirement consists of the following components: (1) task definition which is a specification of the elementary resources which compose an individual task; (2) resource constraints which provide a specification of conditions which must be met in order for resource matching to occur. Only resources from nodes which meet all resource constraints can be allocated to the job req; (3) task count which relates to the number of task instances required by the req; (4) task list which is a list of nodes on which the task instances have been located; (5) req statistics which are statistics tracking resource utilization.

As far as the workload manager is concerned, a node is a collection of resources with a particular set of associated attributes. In most cases, it fits nicely with the canonical world view of a node such as a PC cluster node or an SP node. In these cases, a node is defined as one or more CPU's, memory, and possibly other compute resources such as local disk, swap, network adapters, software licenses, etc. Additionally, this node will described by various attributes such as an architecture type or operating system. Nodes range in size from small uni-processor PC's to large SMP systems where a single node can consist of hundreds of CPU's and massive amounts of memory.

Information about nodes is provided to the scheduler chiefly by the resource manager. Attributes include node state, configured and available resources (i.e., processors, memory, swap, etc.), run classes supported, etc.

Policies are generally specified via a config file and serve to control how and when jobs start. Policies include job prioritization, fairness policies, fairshare configuration policies, and scheduling policies. Jobs, nodes, and reservations all deal with the abstract concept of a resource.

A resource in the workload manager world is one of the following: (1) processors which are specified with a simple count value (2) memory such as Real memory or 'RAM' is specified in megabytes (MB); (3) swap which is virtual memory or 'swap' is specified in megabytes (MB); (4) disk such as a local disk is specified in megabytes (MB). In addition to these elementary resource types, there are two higher level resource concepts used within workload manager. These are the task and the processor equivalent, or PE.

A task is a collection of elementary resources which must be allocated together within a single node. For example, a task can consist of one processor, 512 MB or memory, and 2 GB of local disk. A key aspect of a task is that the resources associated with the task must be allocated as an atomic unit, without spanning node boundaries. A task requesting 2 processors cannot be satisfied by allocating 2 uniprocessor nodes, nor can a task requesting 1 processor and 1 GB of memory be satisfied by allocating 1 processor on one node and memory on another.

In a workload manager, jobs or reservations that request resources make such a request in terms of tasks typically using a task count and a task definition. By default, a task maps directly to a single processor within a job and maps to a full node within reservations. In all cases, this default definition can be overridden by specifying a new task definition. Within both jobs and reservations, depending on task definition, it is possible to have multiple tasks from the same job mapped to the same node. For example, a job requesting 4 tasks using the default task definition of 1 processor per task, can be satisfied by two dual processor nodes.

Figure 2:
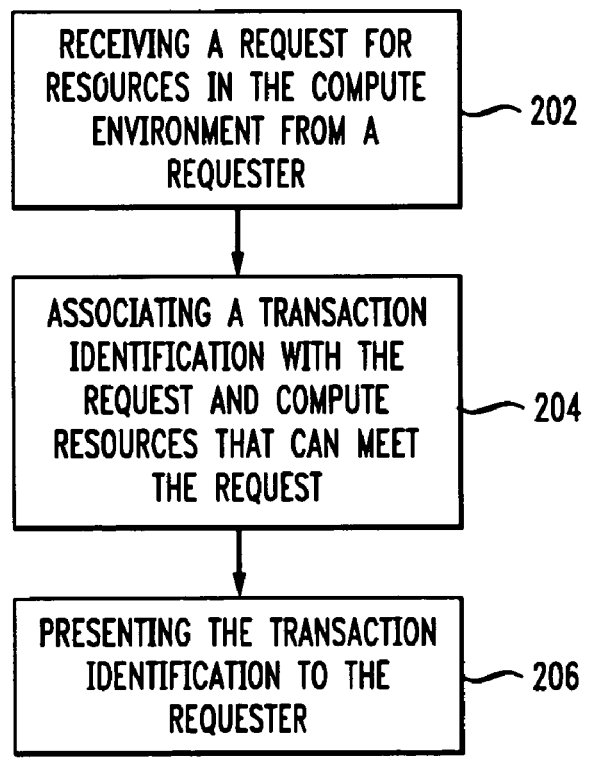
FIG. 2 illustrates an embodiment of the disclosure.

The present disclosure provides an improved means for managing reservations and requests for cluster resources from a submitter. The concept of the transaction identification (ID) that is associated with a submitter's request for resources can simplify the complicated process of identifying resources, reserving resources and modifying resources. FIG. 2 illustrates an example method according to an aspect of the disclosure.

The method of the disclosure is preferably practiced on a compute device such as a server operating a software program that carries out the instructions of the method. The software program can reside on the single server and have modules residing on the various compute devices (nodes) within the cluster environment for communication, provisioning, reserving and for managing jobs submitted for processing on the cluster. In this arrangement, a "system" can be referred to as practicing the steps of the disclosure.

The method of reserving resources within a cluster environment includes receiving a request for resources in the cluster environment from a submitter (202). As an example, the submitter can request for 20 compute nodes and 1 GB of memory for processing a hurricane analysis program. In response to the request, the method includes associating a transaction identification with the request and the compute resources that can meet the request (204). Finally, the method includes presenting the transaction identification to the requestor (206). This step can include a textual or graphical presentation of the cluster resources. For example, a graphical presentation can include a grouping of the 20 nodes and characteristics of those nodes (processor speed, clock speed, etc.) as well as information regarding the available memory. The presentation of the transaction identification to the requestor can include presenting information associated with probabilities of availability. i.e., presenting information such as "there is an 80% probability that the 20 nodes associated with transaction identification 12 will be available within 1 hour".

There are other aspects of this embodiment of the disclosure as well. After presenting the information and associated transaction identification to the submitter, the system can then receive instructions from the submitter to commit the request for cluster resources. This is preferably done via the graphical interface using a simple commit button pressed by the submitter. The system then reserves the compute resources associated with the presented information or commits the request for resources with reference to the transaction identification. Any type of input can be used to provide this communication between the person (user) and the computing system. For example, multimodal inputs via speech, motion, graffiti on a touch-sensitive screen are contemplated as part of the interactive possibilities for submitting jobs and interacting with the system. Using transaction IDs makes multimodal interaction easier since the single ID can be referenced in a multimodal fashion, such as the user simply stating "commit ID five".

The presented information can include at least one time period at which the cluster resources that can meet the request. For example, the information can be that a particular 10 nodes and requested disk space are available to be reserved on Monday at 2 pm and on Thursday at 1 am. The submitter could then simply select the desired time and commit the transaction. Therefore, receiving instructions to reserve the cluster resources can include receiving instructions to reserve the cluster resources for at least one of the identified time periods at which the cluster resources can meet the request. The submitter preferably commits the transaction via reference to the transaction ID. In the graphical interface, this can be accomplished by a button indicating something like "commit transaction 13" or multimodally as discussed above.

Another important aspect of this embodiment of the disclosure is the ability of the system to present to the submitter options to modify the cluster environment. For example, the presented information can include a number of nodes, memory and disk space that is available for several time periods. However, these resources may not be optimal for processing the jobs of the submitter. The software on the nodes can be out of date, the operating system on the nodes can be out of date or not optimal. Therefore, part of the presented information can include this type of information regarding the resources that can be reserved. In addition, the presented information can include options for modifying the resources identified by the transaction ID. The graphical interface can include the transaction ID and options to provision the identified resources. This provisioning can take any form, such as upgrading or installing new software or operating systems, modifying hardware to add further nodes, modifying partitions, etc, and presenting the user with the option to select how to modify the cluster environment before committing a transaction.

The parameters that can be modified include, but are not limited to, disk space, processor speed, number of nodes reserved, memory allocation, bandwidth, and licenses. If the cluster environment is to be modified by the request of the submitter, then as the transaction is committed, then the system can proceed to make the modification to the cluster environment. The presented information can include information associated with the modified resources that, if so modified, the resources can meet the request within a given time frame. In other words, the transaction ID can reflect a potential configuration of the resources. There can be a charge to the user in money, credits, or in some other form for the modification of the resources as requested. Thus, for an extra charge, the user can "supersize" the request.

In this regard, the method, once a request for resources is received, can comprise analyzing the resources in the compute environment and identifying at least one time frame when resources are available to meet the request. Associating the transaction identification with the request and resources within the compute environment that can meet the request can further mean that the software associates a transaction identification with each at least one time frame when resources are available to meet the request.

One aspect of the method includes analyzing potential modifications of the resources in the compute environment and if no modifications of the resources are necessary according to a threshold, then associating the transaction ID with available resources at the at least one time frame. If modifications to the resources are necessary according to the threshold, then the method involves associating the transaction ID with the resources as modified and the at least one time frame. The at least one transaction ID can be associated with a metric which relates to how well the resources match the request. Examples of such a metric include, but are not limited to: response time, overhead required to modify resources, ownership of resources and other policies. The transaction ID can also be other things such as colors in which the user can receive back a gold, silver and bronze ID in which the gold represents the configuration that has the highest metric for the request, the silver the next highest metric, and so forth. Sound, video, icons or other types of multi-modal interaction can also be applied to communicate the resulting analysis to the user for making commitment decisions. This simplifies how the information can be presented to the user.

The software can present the requestor with an option to commit a reservation of resources using the at least one transaction ID and the requestor can have the option to reference resources by the at least one transaction ID when the requestor commits the reservation. The requestor can indicate a commitment of the reservation based on the transaction ID or where there is a group of transaction IDs, the requestor can commit multiple reservations referencing multiple transaction IDs of the group of transaction IDs. The at least one transaction ID can include information about modifications to the resources in the compute environment to be made in order to process workload according to the request. In such a case, when the requestor commits a reservation based on the indicated modifications associated with the transaction ID, the compute environment is reserved and modified for processing the workload submitted under that reservation.

Presenting the requestor with an option to commit the reservation can further comprise presenting the requestor with at least one option to commit the reservation without modifications to the cluster environment and presenting the requestor with at least one option to commit reservations with modifications to the cluster environment. This provides the requestor with flexibility in how to create the reservation, especially if there is an additional charge for modifications to the compute environment.

The modifications can occur immediately upon the commitment of the transaction or can occur later. For example, when the transaction is committed by the submitter, this typically means that the reservation of those resources is made for the submitter. At this stage, a job for processing may not have been submitted to the compute environment. Since it is yet unknown whether a job has been submitted, the system may not yet provision the cluster environment, although the resources are reserved for the submitted at that time. In some cases, a job may never get submitted for the reserved resources. Upon the submission of a job for processing, the system then knows that the resources are going to be used and proceeds to automatically make the provisioning changes to the environment before the job is submitted. This prevents unnecessary provisioning of resources where no jobs will be submitted.

The transaction ID can further be associated with the available resources and at least one time frame and at least one superset of resources with associated time frames for each superset. An example of such a response would be: "transaction ID 2 is associated with 12 available nodes in 1 hour; transaction ID 3 is associated with 15 nodes available in 1.5 hours".

Embodiments within the scope of the present disclosure can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, mini-computers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description can contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

I claim:

1. A method of managing resources within a multi-node compute environment, the method comprising:
   receiving a request for compute resource availability in the multi-node compute environment managed by a common workload manager, wherein the common workload manager reserves compute resources at a first time for jobs to consume the compute resources at a second time that is later than the first time;
   associating, via a processor, a transaction identification with available compute resources that can meet the request via a reservation of the available compute resources;
   presenting the transaction identification to a requestor of the request, wherein associating the transaction identification and presenting the transaction identification occur prior to reserving the available compute resources; and
   reserving the available compute resources associated with the transaction identification to yield reserved compute resources and provisioning software associated with the request on the reserved compute resources by automatically loading the software on nodes within the multi-node compute environment.

2. The method of claim 1, further comprising presenting information associated with the available compute resources that can meet the request further comprises presenting information associated with probabilities of availability associated with the available compute resources.

3. The method of claim 2, further comprising, after presenting the information and presenting associated transaction identification:
   receiving instructions from the requestor to commit the request for the available compute resources.

4. The method of claim 3, wherein receiving instructions to commit the request for available compute resources is accomplished with reference to the transaction identification.

5. The method of claim 2, wherein the presented information further comprises at least one time period in which the available compute resources can meet the request.

6. The method of claim 5, wherein the transaction identification is associated with both the available compute resources and at least one time period in which the available compute resources can meet the request.

7. The method of claim 6, wherein receiving instructions to commit the request for the available complete resources further comprises receiving instructions to reserve the available compute resources for the at least one time period at which the available compute resources can meet the request.

8. The method of claim 1, further comprising presenting an option to modify the compute resources.

9. The method of claim 8, wherein if the requestor selects the option to modify the available compute resources, the method further comprises:
   receiving instructions to modify at least one compute resource of the available compute resources.

10. The method of claim 9, wherein receiving instructions to modify at least one compute resource further comprises receiving instructions to modify at least one of the following parameters associated with a reservation of the available compute resources associated with the transaction identification: disk space, processor speed, number of nodes reserved, memory allocation, bandwidth and licenses.

11. The method of claim 9, wherein receiving instructions to modify at least one compute resource further comprises receiving instructions to perform provisioning of compute resources.

12. The method of claim 11, wherein the instruction to perform provisioning of compute resources further comprises changing an operating system on nodes within the multi-node compute environment.

13. The method of claim 2, wherein presenting information associated with the available compute resources that can meet the request further comprises presenting information associated with modified compute resources that, if so modified, can meet the request in a given time frame.

14. The method of claim 13, wherein the transaction identification reflects a potential configuration of the available compute resources.

15. The method of claim 1, further comprising:
analyzing the available compute resources in the multi-node compute environment and identifying at least one time frame when the available compute resources are available to meet the request, wherein:
associating a transaction identification with the request and the available compute resources within the multi-node compute environment that can meet the request further comprises associating a transaction identification with each at least one time frame when the available compute resources are available to meet the request.

16. The method of claim 15, further comprising:
comparing potential modifications of the available compute resources in the multi-node compute environment to a modification threshold; and
if no modifications of the available compute resources are necessary according to the comparison with the modification threshold, then associating the transaction identification with the available compute resources at the at least one time frame; and
if modifications to the available compute resources are necessary according to the comparison with the modification threshold, then associating the transaction identification with the available compute resources as modified and the at least one time frame.

17. The method of claim 16, wherein the transaction identification is associated with a metric which relates to how closely the available compute resources match the request.

18. The method of claim 17, wherein the metric relates to at least one of: response time, overhead required to modify resources, and ownership of resources.

19. The method of claim 13, further comprising:
presenting the requestor with an option to commit a reservation of the available compute resources using the at least one transaction identification.

20. The method of claim 19, further comprising:
presenting an option to reference resources by the at least one transaction identification when the requestor commits a reservation.

21. The method of claim 19, further comprising:
receiving from the requestor an indication to commit the reservation based on the transaction identification.

22. The method of claim 15, wherein a plurality of transaction identifications is generated and wherein the requestor can commit multiple reservations referencing multiple transaction identifications of the plurality of transaction identifications.

23. The method of claim 15, wherein the at least one transaction identification further comprises information about modifications to the available compute resources in the multi-node compute environment to be made in order to process workload according to the request.

24. The method of claim 23, wherein if the requestor commits the reservation based on the at least one transaction identification the method comprising reserving the available compute resources to yield reserved computer resources and modifying the reserved compute resources for processing the workload.

25. The method of claim 13, where presenting the requestor with an option to commit the reservation further comprises presenting the requestor with at least one option to commit the reservation without modifications to the multi-node compute environment and presenting the requestor with at least one option to commit reservations with modifications to the multi-node compute environment.

26. A method of using transaction identifications, the method comprising:
receiving a request from a requestor for compute resource availability in a multi-node compute environment managed by a common workload manager, wherein the common workload manager reserves compute resources at a current time for jobs to consume the compute resources at a future time relative to the current time;
analyzing, via a processor, compute resources in the multi-node compute environment to determine, for the request, what compute resources are available to yield available compute resources and at least one time frame at which the available compute resources are available;
analyzing at least one superset of the available compute resources for the request and at least one time frame associated with each at least one superset of available compute resources;
generating a transaction identification associated with each of (1) the available compute resources and each at least one time frame and (2) each at least one superset of available compute resources with its associated at least one time frame, wherein generating the transaction identification occurs prior to a reservation of the available compute resources; and
reserving the available compute resources associated with the transaction identification to yield reserved compute resources and provisioning software associated with the request on the reserved compute resources by automatically loading the software on nodes within the multi-node compute environment.

27. The method of claim 26, further comprising, presenting each generated transaction identification to the requestor prior to reserving the available compute resources.

28. A system for managing resources within a multi-node compute environment, the system comprising:
a processor; and
a computer readable medium storing instructions, which, when executed by the processor, cause the processor to perform a method comprising:
receiving a request for compute resource availability in the multi-node compute environment managed by a common workload manager, wherein the common workload manager reserves compute resources at a first time for lobs to consume the compute resources at a second time that is later than the first time:
associating, via a processor, a transaction identification with available compute resources that can meet the request via a reservation of the available compute resources;
presenting the transaction identification to a requestor of the request, wherein associating the transaction identification and presenting the transaction identification occur prior to reserving the available compute resources; and
reserving the available compute resources associated with the transaction identification to yield reserved compute resources and provisioning software associated with the request on the reserved compute resources by automatically loading the software on nodes within the multi-node compute environment.

29. The system of claim 28, wherein the computer readable medium stores further instructions which result in the method further comprising:

analyzing the compute resources in the multi-node compute environment and identify at least one time frame when the compute resources are available to meet the request, and wherein the second module is configured to control the processor to further associate the transaction identification with each at least one time frame when the compute resources are available to meet the request.

30. A non-transitory computer-readable medium storing instructions for controlling a computing device to managing resources within a multi-node compute environment, the instructions causing the computing device to perform a method comprising:

receiving a request for compute resource availability in the multi-node compute environment managed by a common workload manager, wherein the common workload manager reserves compute resources at a first time for jobs to consume the compute resources at a second time that is later than the first time;

associating, via a processor, a transaction identification with the available compute resources within the multi-node compute environment that can meet the request via a reservation of the available compute resources;

presenting the transaction identification to a requestor of the request, wherein associating the transaction identification and presenting the transaction identification occur prior to reserving the available compute resources; and reserving the available compute resources associated with the transaction identification to yield reserved compute resources and provisioning software associated with the request on the reserved compute resources by automatically loading the software on nodes within the multi-node compute environment.

31. The non-transitory computer-readable medium of claim 30, wherein the non-transitory computer-readable medium stores further instructions which result in the method further comprising:

analyzing the compute resources in the multi-node compute environment and identifying at least one time frame when the available compute resources are available to meet the request, wherein associating the transaction identification with the available compute resources further comprises associating the transaction identification with each at least one time frame when the available compute resources are available to meet the request.

* * * * *